Nov. 6, 1962  R. J. BECHT  3,062,230
FILL VALVE
Filed May 27, 1959  2 Sheets-Sheet 1
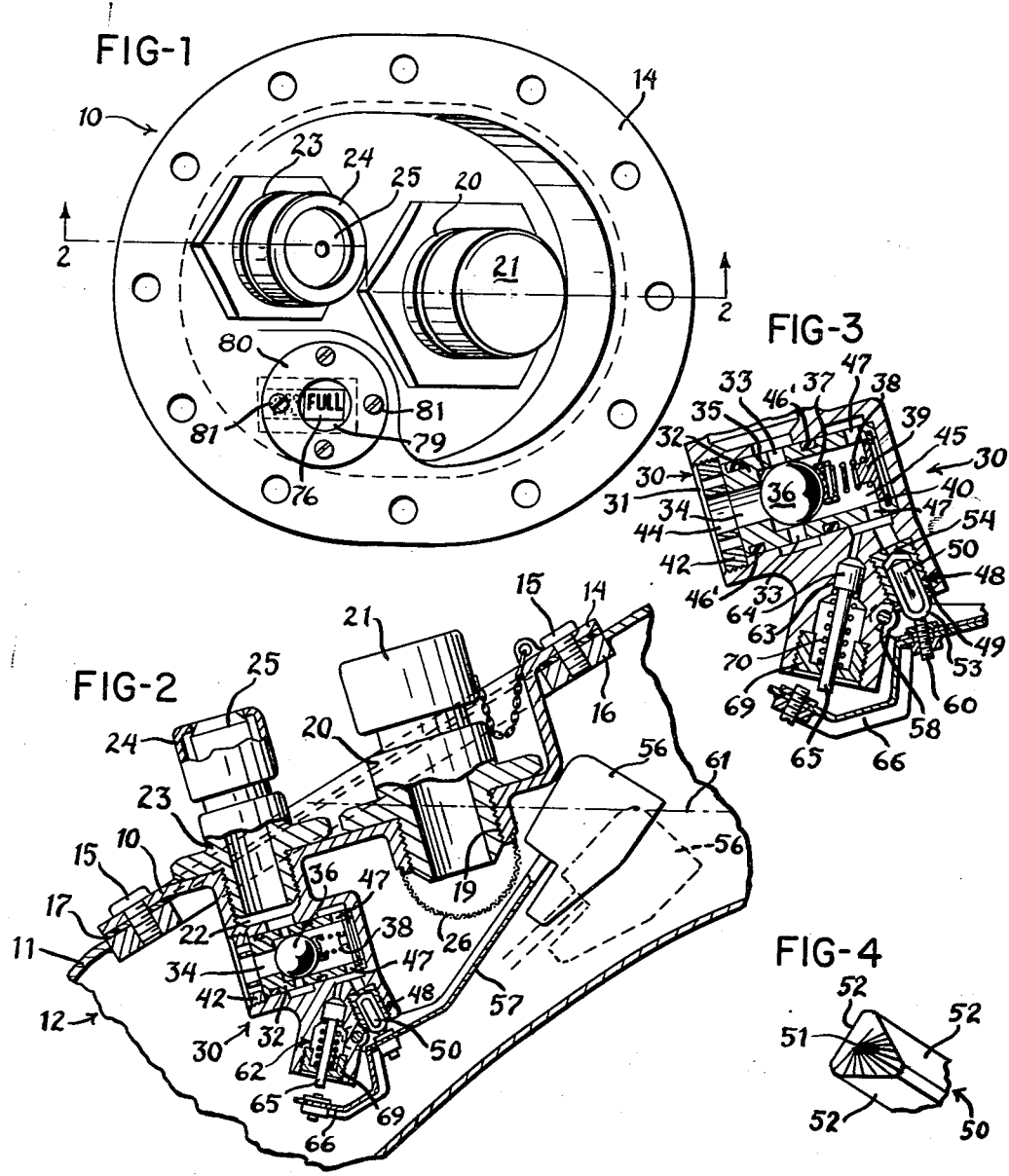
INVENTOR.
RICHARD J. BECHT
BY
Marechal, Biebel, French & Bugg
ATTORNEYS

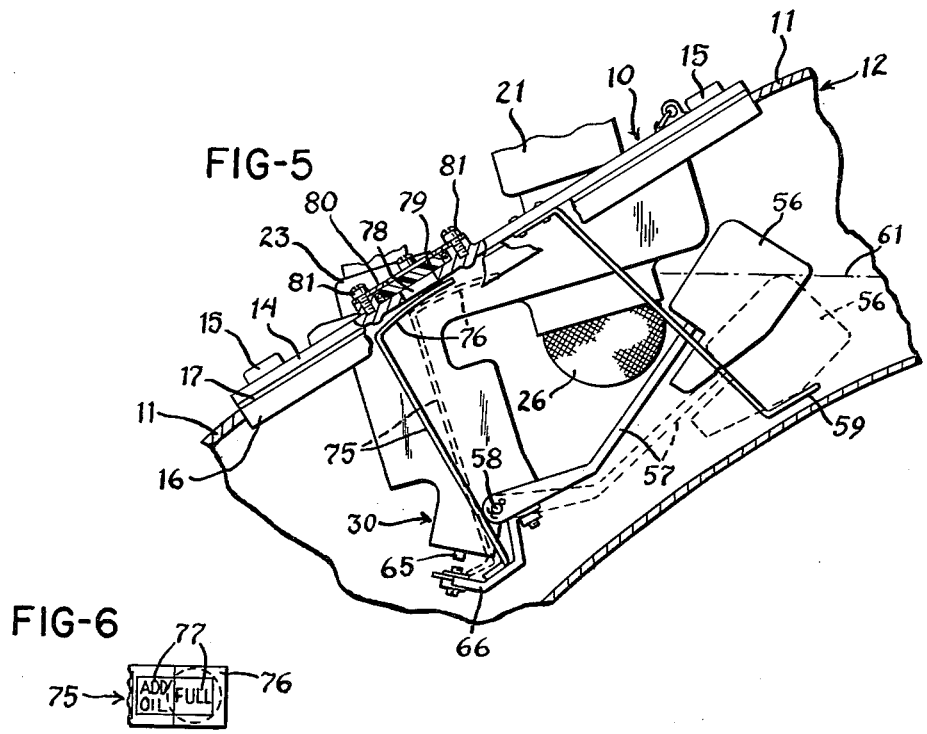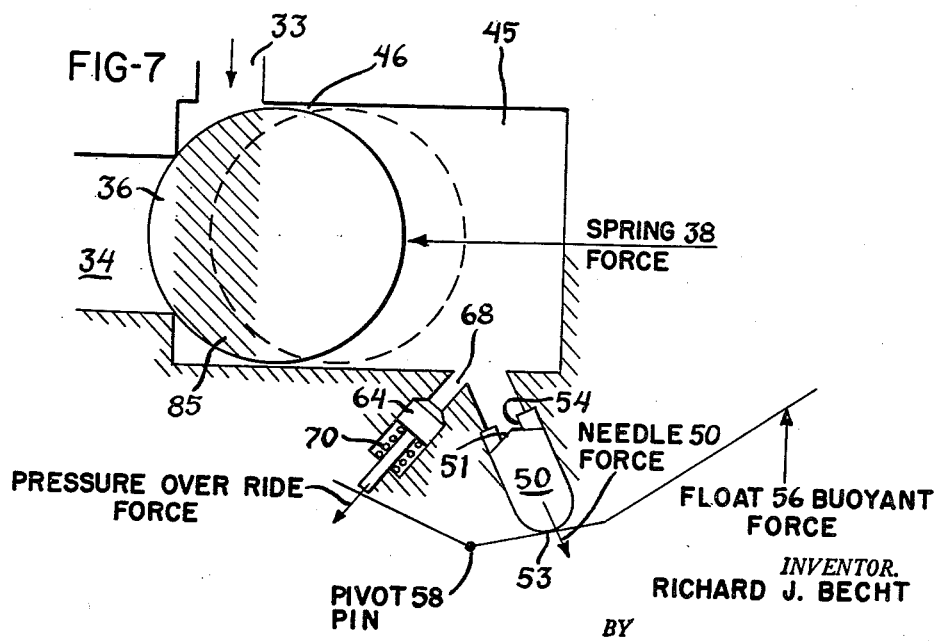

United States Patent Office 3,062,230
Patented Nov. 6, 1962

3,062,230
FILL VALVE
Richard J. Becht, Wethersfield, Conn., assignor to Koehler Aircraft Products Company, Dayton, Ohio, a corporation of Ohio
Filed May 27, 1959, Ser. No. 816,187
3 Claims. (Cl. 137—413)

This invention pertains to fill valves and more particularly to pilot valve controlled fill valves for liquid tanks.

This invention provides a pilot valve controlled fill valve for liquid tanks that eliminates all flow stopping diaphragm and moving elastomeric or cloth components by the use of a ball for controlling liquid flow from an inlet to an outlet. The valve of this invention closes to prevent further filling when a float-operated pilot valve, which controls the pressure on an area of the ball, is closed by the changing liquid level. This valve has the advantage of being able to handle and control the filling of liquids over a wide range of viscosities and temperatures since it contains no diaphragm that could become brittle at low temperatures and deteriorate at high temperatures. Therefore, this valve is also adaptable for handling corrosive and aromatic liquids, and at the same time, is inexpensive to make and has a long service life.

The valve of this invention includes an override provision which assures the closing of the pilot valve under unusually high inlet loading pressures, and permits a reduction in the size of the float. In the preferred embodiment shown, this override consists of a pressure responsive member in the form of a piston arranged in force assisting relation to the float to assist in maintaining the pilot valve closed against unusualy high operating pressures. The valve body also includes a window through which a float-operated indicator flag may be viewed as a visible indication of the liquid level.

It is therefore an object of this invention to provide a fill valve as outlined above adapted for the control of aromatic or corrosive liquids over a wide range of temperatures and viscosities.

A further object of this invention is to provide a fill valve as outlined above which utilizes a differential pressure responsive ball closure member to eliminate diaphragms and moving elastomeric components.

A still further object of this invention is to provide a fill valve as outlined above including a pressure override member for assisting in maintaining the float closed upon the occurrence of high inlet pressures.

Another object of this invention is to provide a fill valve as outlined above that is economical to make and easy to maintain.

A still further object of this invention is to provide a fill valve for a liquid tank with an indicator viewable from the exterior of the tank to provide an indication of the quantity of liquid within the tank.

Other objects and advantages of the invention will be apparent from the following description, the accompanying drawings, and the appended claims.

In the drawings:

FIG. 1 is a plan view of the valve of this invention;

FIG. 2 is a section through the valve generally along line 2—2 of FIG. 1;

FIG. 3 is an enlarged fragmentary showing of the valve body showing the float lever in the lower position;

FIG. 4 is a perspective detail of the needle in the pilot valve;

FIG. 5 is a partially broken away elevational view of the valve;

FIG. 6 is a detail of a portion of the indicator flag; and

FIG. 7 is a schematic illustration of the principle of operation of this invention.

With reference to the drawings, which illustrate a preferred embodiment of the invention, a fill valve, suitable for controlling the filling of liquid tanks, such as oil tanks on jet engines, includes a generally plate-like body 10. In FIG. 2 the body 10 is shown as being mounted within an opening formed within the top 11 of a tank 12. The body 10 includes a circumferential mounting flange 14 for engagement by bolts 15 to a ring 16 fixed at the inside surface of the top 11. A gasket 17 may be fitted between the flange 14 and the ring 15 to make a liquid tight seal.

The body 10 includes a large liquid opening 19 into which an adaptor 20 with a removabe cap 21 is threaded. The body further includes a small liquid opening 22 into which another adaptor 23 with a cap 24 is threaded. The adaptors 20 and 23 may each include a spring biased closure valve 25 which is arranged to be opened upon the application of a filling nozzle thereto. They are well known in the art and form no part of this invention. The large opening 19 is provided as a means by which the tank 12 may be filled by hand through the adaptor 20. A hemispherical screen 26 is fitted to the body 10 beneath the opening 19 for the purpose of filtering the filling liquid.

The valve includes means by which the tank 12 may be quickly filled through the small opening 22 from a pressurized source of liquid, such as from a supply drum with a gear pump feed without danger of overflowing. The opening 22 is connected to the interior of the tank 12 through a float-controlled shut-off mechanism indicated generally at 30. The mechanism 30 operates to prevent further filling upon a predetermined liquid level within the tank 12 and includes a generally cylindrical body cavity 31 into which a ball housing 32 is received. The housing 32 includes a pair of radially extending inlets 33 and an axial outlet 34 defined by an annular ball seating shoulder 35.

A ball 36 is received within the housing 32 and is normally held in sealing relation over the outlet 34 against the shoulder 35 by a cup-shaped spring follower 37 and a compression spring 38. A spring retainer 39 holds the spring 38 within the housing and is, in turn, held within the housing by a circlip 40. An apertured retaining nut 42 is threaded into the open end of the cavity 31 with its central opening 44 in alignment with the outlet 34 in the housing 30 to provide a means by which the fluid may pass from the inlet 33 into the interior of the tank. The radial inlets 33 and the outlet 34 are arranged with respect to the ball 36 so that when the ball is seated on the shoulder 35 closing the outlet 34, only the portion of the ball 36 between the shoulder 35 and the housing 32 is subject to pressure of fluid entering from the inlet opening 22.

The body 10 and the housing 32 together form means defining a pressure chamber 45 on the side of the ball 36 remote from the outlet 34. The mechanism 30 includes bleed passageway means connecting the chamber 45 to the inlet 33. In this instance, use is made of the fact that the ball does not form a tight fit within the housing 32, and leakage occurs along a path 46 from the inlets 33 circumferentially about the ball 36 into the chamber 45. It is of course possible to provide a parallel bleed path through the housing 32, but this has been found unnecessary as sufficient fluid transfer occurs, as described, to effect the rapid pressure build-up in the chamber 45 from the inlet 33. A pair of O-rings 46' are mounted in the housing 32 between the body 10 in the cavity 31 and the housing 32 to seal the chamber 45 from the inlets 33, and the inlets 33 from the outlet 34.

The mechanism 30 includes pilot valve means in the body 10 connected to the chamber 45 for controllably bleeding off pressure in the chamber 45 from the bleed path 46 around the ball 36. A pair of radial openings 47 are formed in the housing 32 for communication with a pilot valve 48 in the body 10. The pilot valve 48 includes valve seat 49 threaded into the body 10 and a generally triangularly shaped needle 50 within the valve seat 49. The needle 50 includes an orifice closing tip 51, three flat sides 52 to permit liquid flow therepast, and an exposed end 53. The tip 51 of the needle 50 is arranged for coaction with an orifice 54 formed in the end of the seat 49.

The needle valve is controlled by a float 56. The float 56 is secured to the extended end of a float lever 57 pivotally mounted on the body 10 at a pivot pin 58 and is movable between an upper limit as shown by full lines in FIG. 5 to a lower position against a float retainer arm 59 as shown in broken outline form. An adjustable set screw 60 is carried by the float for coaction with the exposed end 53 of the needle 50 upon the pivotal movement of the float 56 about the pin 58, for closing the needle valve 48 when the fluid reaches the maximum level corresponding to the line 61.

Since the fill valve of this invention is adapted for use with high viscosity liquids, such as oil, it is desirable to use a larger orifice 54 and needle 50 in the pilot valve 48 than is necessary when comparatively light or low viscosity liquids are handled. In such instances, the higher frontal area of the needle 50 subjected to pressures from the chamber 45 upon rapid closing may tend to prevent the smooth closing of the needle and may cause the ball 36 to chatter against the shoulder 35. Also, closing of the needle valve 48 may cause a pressure surge within the chamber 45 due to a pressure build-up at the inlet which may force the needle 50 off the seat 49. Accordingly, a movable pressure responsive device indicated generally at 62 is arranged in a force assisting relation to the pilot valve 48 and is moved upon a predetermined pressure within the chamber 45 to assist in maintaining the closure of the needle valve 48 against the pressure in the chamber 45.

The device 62 is formed as an integral extension of the body 20 which is bored at 63 to receive a piston 64. The piston 64 includes an attached push pin 65 which extends beyond the body 10 for coaction with a rearwardly extending portion 66 of the float lever 57. A small passageway 68 in the body 10 subjects the end of the piston 64 to the pressure within the chamber 45. The piston 64 is held within the bore 63 by a threaded cap screw 69 and a spring 70 fitted over the pin 65 between the screw 69 and the piston 64. The pin 65 is extended for axial movement through the cap screw 69.

The piston 64 is arranged to move against the rearwardly extending portion 66 of the float lever 57 upon the occurrence of a predetermined maximum pressure within the chamber 45 to assist the float lever in maintaining closure of the needle valve. Once the needle valve is closed, the ball 36 will be forced against the outlet 34 by reason of the differential pressure on the ball caused by the pressure distribution over differential areas.

A visual indicator is provided by means of which personnel can observe whether the tank 12 is full or requires replenishing. This includes a flag 75 fixed for movement with the rearwardly extending portion 66 of the float lever 57 and having a curved upper portion 76 upon which indicating information 77 is formed, as shown in FIG. 6. The body 10 includes a flag viewing opening 78 over the portion 66 upon which a piece of clear plastic 79 is held in sealing relation by a ring 80 and screws 81, and through which the information 77 may be viewed from outside the tank.

The operation of the invention is most readily understood from the simplified diagram of the valve in FIG. 7. The shaded area 85 of the ball 36 represents the portion of the ball which is subject to pressure from the inlet 33 when the ball is in the closed position shown. Upon the application of fluid under pressure to the inlet 33, the force caused by liquid on the projected area 85 will cause the ball 36 to move to the right against the force of the spring 38 from a first position for stopping flow between the inlet 33 and the outlet 34 to a second position permitting flow from the inlet 33 through the outlet 34 and into the tank 12. The pressure which is required to move the ball 36, sometimes called the "cracking" pressure, may be varied by varying the force of the spring 38. In this manner, the tank 12 may be continued to be filled from the inlet 33 and the outlet 34. During filling, a small quantity of the filling liquid flows through the bleed path 46 into the pressure chamber 45, where pressure build-up is prevented by fluid escape through the open pilot valve 48.

When the tank in this manner is filled, the liquid level within the tank will cause the float to rise, thereby causing the needle 50 of the pivot valve 48 to approach the orifice 54 in the seat 49. The liquid within the chamber 45, having no place to escape, will increase in pressure until the pressure in the chamber 45 is at least equal to the pressure at the inlet 33. Even before this occurs, the ball 36 will begin to move toward the shoulder 35 due to the fact that the pressure in the chamber 45, acting upon substantially half of the ball 36, is greater than the pressure at the outlet 34 by reason of the acceleration of the liquid at the shoulder 35. This closing action is accumulative so that once the ball 36 is against the shoulder 35, the inlet pressure acts only upon the shaded area 85 to move the ball to the right and upon the hemispherical portion of the ball exposed to the chamber 45 to hold the ball against the shoulder 35. Although this closing action is assisted by the spring 38, the differential forces caused by the differential pressures and areas are sufficient to cause the closure of the valve without assistance of a spring.

On closure of ball 36 on seat 35 the pressure at the inlet 33, and therefore in the chamber 45, may become sufficiently high, to overcome float moment force on the needle 50, as mentioned. When this occurs, the piston 64, being subject to this pressure, is moved against the spring 70 to contact the extended portion 66 of the float arm 57 and causes a force to be applied against the arm in assisting relation to the lift provided by the float. Therefore, the piston 64 assures the retention of positive closing of the needle valve 48 even though the pressures at the inlet 33 may be very high, or may surge to very high momentary pressures.

If desired, the tank may be filled by hand through the large opening 19. The flag 75 under the window 78 will operate to indicate when the tank is full to avoid overflowing.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A fill valve for a liquid tank, comprising body means defining a liquid inlet and an outlet, a closure member in said body means interposed between said inlet and said outlet and movable in response to a differential pressure thereacross to isolate said inlet from said outlet, a pressure chamber in said body means on a side of said member remote from said inlet with an area of said member being exposed to said chamber, passageway means connecting said inlet to said chamber providing for liquid flow from said inlet into said chamber, a float operated pilot valve opening into said chamber having a needle arranged for movement with such float providing for the removal of liquid therefrom in response to a low liquid level in such tank and for the closure of said chamber by said needle upon the occurrence of a predetermined high liquid level therein, said needle being subject to fluid pressure in said chamber tending to open said pilot valve, and a surge pressure relieving piston in said body means and exposed to the pressure in said chamber, a spring biasing said piston toward said chamber, said piston movable upon the occurrence of a predetermined surge pressure within said chamber to increase the volume of said chamber to relieve said surge pressure tending to open said pilot valve.

2. A fill valve for a liquid tank, comprising a valve body, means in said body defining a cylindrical cavity, a self-contained ball housing removably received within said cavity, means in one end of said housing forming an annular ball seating shoulder defining an outlet, a ball in said housing movable into a flow stopping relation against said shoulder, spring retainer means in the end of said housing opposite said outlet, a spring interposed between said retainer means and said ball for holding said ball in a normally seated position against said shoulder, an apertured nut threaded into said body at said cavity for retaining said housing therein and defining a valve outlet opening in alignment with said housing outlet, a liquid inlet in said body, means in said housing defining an inlet passageway opening into said body inlet and positioned in laterally spaced relation from said shoulder between said shoulder and the periphery of said ball when said ball is in said flow stopping relation, a liquid bleed path between said housing and said ball from the side of said ball adjacent said shoulder to the other side of said ball providing for the flow of liquid from said inlet to said other side, and a pilot valve in said body opening into said housing adjacent said other side for controllably removing liquid accumulating therein from said bleed path.

3. A fill valve for a liquid tank, comprising body means defining a liquid inlet and an outlet, a closure member in said body means interposed between said inlet and said outlet and movable in response to a differential pressure thereacross to isolate said inlet from said outlet, a pressure chamber in said body means on a side of said member remote from said inlet with an area of said member being exposed to said chamber, passageway means connecting said inlet to said chamber providing for liquid flow from said inlet into said chamber, a float, a pilot valve opening into said chamber having a needle arranged for movement by said float for the removal of liquid therefrom in response to a low liquid level in such tank and for the closure of said chamber by said needle upon the occurrence of a predetermined high liquid level therein, said needle being subject to fluid pressure in said chamber tending to open said pilot valve, and a surge pressure relieving piston in said body means exposed to the pressure in said chamber, said piston movable through a first distance upon the occurrence of a predetermined surge pressure within said chamber to increase the volume of said chamber and further movable through a second distance in response to continued chamber pressure into contact with said float to assist in closing said pilot valve.

References Cited in the file of this patent

UNITED STATES PATENTS

| | | |
|---|---|---|
| 1,627,486 | Cravens | May 3, 1927 |
| 2,712,828 | Badger | July 12, 1955 |
| 2,738,801 | Reaves | Mar. 20, 1956 |
| 2,775,258 | Fraser | Dec. 25, 1956 |
| 2,788,018 | Sogn | Apr. 9, 1957 |
| 2,855,949 | Sterner | Oct. 14, 1958 |

FOREIGN PATENTS

| | | |
|---|---|---|
| 4,067 | Great Britain | Dec. 10, 1873 |
| 4,785 | Great Britain | Mar. 27, 1890 |
| 17,839 | Great Britain | Aug. 14, 1902 |
| 217,688 | Australia | Oct. 3, 1958 |
| 493,822 | France | May 14, 1919 |